(12) United States Patent
Sheehy et al.

(10) Patent No.: US 7,085,145 B2
(45) Date of Patent: Aug. 1, 2006

(54) WIDE BANDWIDTH AC-DC POWER CONVERTER

(75) Inventors: Robert Sheehy, Ringwood East (AU); Nigel Machin, Hawthorn (AU); Jurien Dekter, Mount Evelyn (AU)

(73) Assignee: Rectifier Technologies Pacific Pty Ltd., Blackburn Nth (AU)

( * ) Notice: Subject to any disclaimer, the term of this patent is extended or adjusted under 35 U.S.C. 154(b) by 0 days.

(21) Appl. No.: 10/507,878

(22) PCT Filed: Mar. 18, 2003

(86) PCT No.: PCT/AU03/00325

§ 371 (c)(1),
(2), (4) Date: Sep. 15, 2004

(87) PCT Pub. No.: WO03/079529

PCT Pub. Date: Sep. 25, 2003

(65) Prior Publication Data

US 2005/0117374 A1   Jun. 2, 2005

(30) Foreign Application Priority Data

Mar. 18, 2002   (AU) .................................. PS1183

(51) Int. Cl.
H02M 1/14   (2006.01)
(52) U.S. Cl. ............................................. 363/44
(58) Field of Classification Search .......... 363/44, 363/47, 48
See application file for complete search history.

(56) References Cited

U.S. PATENT DOCUMENTS

| 5,132,894 A | * | 7/1992 | Rozman et al. ............... 363/51 |
| 5,504,667 A | * | 4/1996 | Tanaka et al. ................ 363/37 |
| 6,115,267 A | | 9/2000 | Herbert ........................ 363/25 |
| 6,297,980 B1 | | 10/2001 | Smedley et al. .............. 363/89 |

FOREIGN PATENT DOCUMENTS

| EP | 0 642 211 | 3/2000 |
| GB | 2 248 981 | 4/1992 |

OTHER PUBLICATIONS

"A Parallel Connected Single-Phase Power Factor Correction Approach with Improved Efficiency", Kim et al., Applied Power and Electronics Conference, Mar. 10-14, 2002, vol. 1, pp. 263-269.

"Status of the Techniques of Three-Plus Rectifier Systems with Low Effects on the Mains", Kolar et al., International Telecommunications Energy Conference, Jun., 1999.

* cited by examiner

Primary Examiner—Jeffrey Sterrett
(74) Attorney, Agent, or Firm—Baker & Daniels

(57) ABSTRACT

The invention provides a wide bandwidth power converter. In one application the invention is useful for AC to DC power conversion from a polyphase power supply with high line impedances and includes a single stage low bandwidth AC to DC power converter providing a DC output and, a filter means for the DC output including a bidirectional shunt active filter having an energy storage element and circuitry for wide bandwidth control of fluctuations at the DC output, arising from line borne or load induced disturbances, by transferring energy to or from the energy storage element. The transferred energy is low level relative to the magnitude of the AC to DC converter output energy enabling the size of the energy storage element to be minimized.

14 Claims, 5 Drawing Sheets

WIDE BANDWIDTH AC-DC POWER CONVERTER

FIELD OF INVENTION

The present invention relates generally to the field of power converters. In particular, the invention relates to a technique and device for AC to DC power conversion. In one particular application, the invention is useful for AC to DC power conversion from a polyphase power supply with high line impedances where there is a restriction on the size of line side capacitance due to a requirement of near unity power factor for the power drawn from the supply. It will therefore be convenient to hereinafter describe the invention in relation to that application. It should be appreciated, however, that the present invention is not limited to that application, only.

BACKGROUND OF INVENTION

When medium to wide bandwidth polyphase AC to DC converters are used in the presence of high line impedance, as occurs with motor-generator sets or poorly regulated AC sources, instability problems are commonly observed. Instability at the input of a wide bandwidth polyphase power converter is caused by the interaction of the negative input impedance presented by the power converter and the positive effective source impedance. The effective source impedance may be defined as the combined impedance of the AC to DC converter input filter and the power supply line.

The real component of the input impedance of a power converter drawing constant power varies from negative at low frequencies to positive at high frequencies, crossing over at the closed loop bandwidth of the power converter. The effective source impedance is a maximum at the effective source resonant frequency of the combined input filter and line inductance and the input filter capacitance.

Unstable operation of a power converter is undesirable because it can lead to, for example, saturation of magnetic components, an increase in the level of input and output noise, failure of passive and active components due to overheating, and a reduction in the power factor due to an increase in the total amount of volt-amperes being drawn from the supply.

For a power converter to achieve a condition of stability, ordinarily the magnitude of the input impedance of the power converter must be greater than the effective source impedance for all load conditions. If this condition is violated, the sum of the real components of the input impedance of the power converter and the effective source impedance must be positive in an operating region where the condition is violated to ensure stable operation of the power converter. A more complete discussion of this requirement to achieve stability is found in Jang, Y., Erickson, R. W.: "*Physical Origin of Input Filter Oscillations in Current Programmed Converters*", ", IEEE Trans. Power Electronics, vol. 7, Iss. 4, October 1992, pp 725–733.

One prior art method commonly used to meet this stability criterion is to lower the effective source impedance by increasing the input filter shunt capacitance until stability is achieved. However, this is not practical or advisable in AC to DC converters with a requirement for near unity power factor. In providing near unity power factor there is a limit on the amount of input shunt capacitance that may be used, since shunt capacitance degrades power factor. As an alternative, the closed loop bandwidth of the AC to DC power converter must be reduced below the effective source resonant frequency to prevent instability. Reducing the bandwidth makes the input impedance of the power converter positive in the region of violation, as mentioned above, thus satisfying the stability criterion. Either a fixed or variable low bandwidth AC to DC converter may be used to achieve stability in this manner. Ordinarily, a fixed low bandwidth may be designed to be below the worse case effective source resonant frequency, while a variable bandwidth may track the actual source resonant frequency and provide improved rejection of line borne disturbances from the output of the AC to DC converter in cases other than worst case. Both of these measures result in a degree of line borne disturbance at the output and a degradation in the load transient response compared to a wide bandwidth AC to DC converter, especially in a high line impedance case.

An illustration of one prior art technique designed to address the above mentioned stability problem is shown in FIG. 1, where two converter stages are used. The first stage converter has low bandwidth and may pass some or all line frequency harmonics and line borne disturbances to a DC link capacitor positioned between the two stages forming a high noise DC link. The second stage comprises a DC to DC converter that regulates the output voltage of the converter and rejects any voltage variation appearing on the high noise DC link that may be transferred by the first stage converter. In this case, the DC link capacitor provides a low source impedance to the second stage for all loads, thereby permitting the second stage to have wide bandwidth and address the stability problem. The disadvantage of this approach is that it processes all the output power twice resulting in, for example, reduced efficiency, increased complexity and size compared to a single stage AC to DC converter.

As a possible alternative, the second stage converter might be omitted and the DC link capacitor increased in value to perform the function normally done by the second stage converter. A simple calculation based on a commonly required specification for noise and load transient response in the presence of a low bandwidth (for example 500 Hz) bandwidth first stage, reveals why this alternative is not viable: The value and therefore the size of the storage capacitor is very large, completely negating any advantage gained by simplifying the power converter circuitry in this way.

Another prior art technique uses damping, either active or passive, to reduce the resonant peak in the effective source impedance. Referring to FIG. 2, for power converters with marginal stability on a known maximum line impedance, several damping arrangements of the input filter are possible and this is exemplified in Vlatkovic, V., Borojevic, D., Lee, F. C., "*Input Filter Design for Power Factor Correction Circuits*", IEEE Trans. Power Electronics, Vol. 11, No. 1, January 1996 pp 199–205. In FIGS. 2a and 2b, two examples of single phase passive damping circuit arrangements are shown, either a series RC in parallel with the shunt capacitance C1 as shown in FIG 2a, or a parallel LR in series with the filter inductance L1 as shown in FIG. 2b. An example of three phase active damping is shown in FIG. 2c.

Referring to FIG. 2a, addition of a damping resistance Rd in series with a portion of the total filter shunt capacitance C1a and C1 may damp the resonance that occurs in the input filter. One of the problems with such an arrangement, however, is that the reactive line frequency current flowing in the shunt capacitance C1a produces a significant loss in the series resistance Rd, thereby reducing the converter efficiency and requiring a substantial increase in the total size of the input filter to prevent overheating. In addition, the damping capacitance C1a is required to be equal or larger than the shunt capacitance C1, resulting in a substantial increase in the size of the input filter and a degradation of the power factor.

Referring to FIG. 2b, the addition of a parallel inductance Ld and damping resistance Rd in series with the filter inductance L1 also damps the resonance that occurs in the input filter. However, for high line impedances the size of the extra inductance Ld becomes impractical and also increases the total series line impedance thereby negating any expected stability margin improvement.

Referring to FIG. 2c, the linear active circuit containing a control circuit, a power amplifier and three current transformers L, is used to damp the filter resonant peak by sensing the inductor current and injecting a canceling current. A further description of this technique is found in Vlatkovic, V., Lee, F. C., Borojevic, D.: "*Damped EMI Input Filter Power Factor Correction Circuits*", and U.S. Pat. No. 5,530,396 (Vlatkovic et al) issued 25 Jun. 1996. This technique has limited success because it is commonly used to damp only the input filter resonance, and does not take into consideration the effect of high line impedance, which dominates in many cases. If the line impedance resonance were damped using this method, the damping circuit then becomes large and less efficient, reducing any advantages gained.

Passive and linear active damping schemes are usually bulky and lossy for critical damping. They provide a limited benefit to the converter stability because a practical limit occurs when critical damping is achieved and further damping will not significantly reduce the effective source impedance. This is because the impedance stability criterion described above will still be violated at some load. For high line impedance cases, instability will occur if a wide bandwidth converter is used, even with a critically damped filter.

Active damping may also be achieved in a substantially lossless manner by controlled switching by way of Pulse Width Modulation (PWM). Examples of such techniques may be found in Marques, G. D.: "*A Current-type PWM Rectifier Control System with Active Damping Based in the Space Vector Technique*", IEEE Proc. of Industrial electronics ISIE 1997 pp. 318–322 vol. 2; Sato, Y., Katoka, T.: "*A Current-type PWM Rectifier with Active Damping Function*", IEEE Trans. Industry Applications, Vol., 32, Iss. 3, May–June 1996, pp 533-541; and, Baumann, M., Drofenik, U., Kolar, J. W.: "*New Wide Input Voltage Range Three-Phase Unity Power Factor Rectifier Formed by Integration of a Three-Switch Buck-Derived Front-End and a DC/DC Boost Converter Output Stage*", $22^{nd}$ Intelec Proc., September 2000, pp. 461–470. However, these schemes pass line borne disturbances to the output of the AC to DC converter, and therefore require further measures, such as a second stage converter to remove such disturbances from the output. Generally, these schemes, including their further measures, are a variation on the prior art of FIG. 1.

A further prior art technique is shown in FIG. 3, comprising a polyphase shunt active filter connected to the input of a polyphase AC to DC converter, which operates to compensate for load reactive power and line harmonics. Further description of such compensation techniques is found in Rastogi, M., Mohan, N., Edris, A.: "*Filtering of Harmonic Currents and Damping of Resonances in Power Systems with a Hybrid-Active Filter*", IEEE APEC Proc., March 1995, pp. 607–612 (Rastogi et al); and, Newman, M. J., Zmood, D. N.: "*Stationary Frame Harmonic Reference Generation for Active Filter Systems*", IEEE Trans. Industry Applications, Vol. 38, No. 6, November 2002, pp 1591–1599 (Newman et al). As a by-product of performing their primary function of filtering harmonic currents, such active filters may also lower the source impedance in the frequency band where instability would otherwise occur. However, the primary function of these filters is to filter harmonic currents and as a result, the design of these circuits, as described in Rastogi et al and Newman et al involves large complex circuitry directed at targeting harmonic currents specifically and is not applied to the instability problem resulting from high line impedance. Accordingly, there is no real discussion of the instability problem in either of Rastogi et al or Newman et al. The main disadvantages of these prior art techniques are the high degree of complexity and large size of the shunt active filters.

Further prior art schemes for power conversion are disclosed in U.S. Pat. No. 6,115,267 (Herbert) issued 5 Sep. 2000 and, U.S. Pat. No. 5,144,222 (Herbert) issued 1 Sep. 1992. U.S. Pat. No. 6,115,267 is directed to a transformer isolated, Power Factor Corrected (PFC) AC-DC power converter comprising a main power path which is buck derived, and most of the power passes through a single power stage to the output. A parallel path in the secondary circuit shunts current to a storage capacitor during the times when the input AC current is at its peak, and returns current to the circuit when the input AC current is low. In one embodiment, the shunt stage comprises a secondary side boost converter. In another, the shunt stage comprises a buck converter. U.S. Pat. No. 6,115,267 addresses the problem of input rectifiers contributing significantly to losses in the converter by a single phase power converter circuit in which the input stage may operate without input rectifiers if AC switches, such as back to back MOSFET's are used, because the output of the transformer and secondary rectifiers is the same regardless of the polarity of the instantaneous input voltage. Although U.S. Pat. No. 6,115,267 discloses a single power stage that may be operated as a low bandwidth converter, this reference like Rastogi et al and Newman et al, does not discuss or set out to address the instability problem. There is no discussion or attempt to address the increase in line borne disturbances and degradation in the load transient response that results from using a low bandwidth converter, compared to a wide bandwidth converter.

U.S. Pat. No. 5,144,222 discloses techniques for the polyphase power conversion case. However, this reference again has no discussion of the stability problem associated with high input line impedances and discloses dual stage power converters similar to those of FIG. 1. Furthermore, the converter stages disclosed in U.S. Pat. No. 5,144,222 comprise complex combinations of buck or boost converters with additional complex control circuitry requiring more than one controller in its stages.

The prior art single phase AC to DC converters, do not suffer from the stability problem since they use and usually require a very low bandwidth AC to DC converter stage in some form for power factor correction. In addition, a large energy storage element is used to provide power to the DC output during the region where the AC supply voltage crosses zero and this capacitor also acts to smooth the DC output. A discussion of single phase systems is found in Tse, C. K., Chow, M. H. L., Chung, M. K. H.: "*A Family of PFC Voltage Regulator Configurations with Reduced Redundant Power Processing*", IEEE Trans. Power Electronics, vol. 16, No. 6, November 2001, pp 794–802.

In general, the prior art techniques discussed above increase the size and limit the efficiency of polyphase AC to DC power converters when there is a necessity to operate on sources with high line impedance.

Any discussion of documents, devices, acts or knowledge in this specification is included to explain the context of the invention. It should not be taken as an admission that any of the material formed part of the prior art base or the common general knowledge in the relevant art in Australia or elsewhere on or before the priority date of the claims herein.

It is an object of the present invention to provide a power converter, which alleviates at least one disadvantage of the prior art arrangements. Another object of the present invention is to provide a wide bandwidth polyphase AC to DC converter capable of operating on high line impedance with minimal energy storage elements and conversion stages to enable a reduction in converter size while increasing the conversion efficiency.

SUMMARY OF INVENTION

The present invention provides a wide bandwidth polyphase power converter for connection to a polyphase power supply with high line impedances including:
- a single stage low bandwidth AC to DC power converter providing a DC output; and
- a filter means for the DC output including a bi-directional shunt active filter having an energy storage element and circuitry for wide bandwidth control of fluctuations at the DC output, arising from line borne or load induced disturbances, by transferring energy to or from the energy storage element.

In essence, the present invention stems from the realisation that in providing a single stage low bandwidth AC to DC power converter to overcome the high line impedance problems discussed above, there are limitations introduced in such circuits requiring further processing to address the effect of line disturbances, load transients and the like. To this end the invention provides wide bandwidth controlled transfer of energy corresponding to the line disturbances and load transients to or from an energy storage element. The transferred energy is low level relative to the magnitude of the AC to DC converter output energy, and this enables the size of the energy storage element to be minimised.

The low bandwidth power converter may have a fixed or variable bandwidth. In embodiments of the invention, the DC output fluctuations are reactive or transient, or both, in nature. The DC output power fluctuations, at peak, may typically be less than one third of the power input to the low bandwidth power converter. In the absence of any reactive or transient power fluctuations the shunt active filter ideally does not transfer any significant energy.

The low bandwidth power converter may include an isolation device so as to isolate the DC output from the AC supply.

The low bandwidth power converter may be configured to include a buck or buck derived converter, a boost or boost derived converter, or any other type of converter including Sepic, Zeta, flyback and Cuk, or any combination or derivation thereof. Furthermore, the shunt active filter may include circuitry configured as a buck converter, a boost converter, or any other type of converter including Sepic, Zeta, flyback, and Cuk, or any combination or derivation thereof.

The low bandwidth power converter in one particular embodiment includes an input filter, a full bridge of AC switches, a high frequency isolation transformer, a secondary rectifier, a lowpass output filter and a low bandwidth control circuit for controlling the AC switches. The shunt active filter preferably includes a half bridge of bi-directional switches, an inductance, an energy storage capacitor and a wide bandwidth control circuit. In a particular embodiment, the shunt active filter is connected between a positive and a negative output of the low bandwidth power converter. Preferably, the low bandwidth power converter has a closed loop bandwidth of less than about 500 Hz and the shunt active filter has a closed loop bandwidth of greater than about 50 kHz.

The present invention has the advantages of permitting the reduction of closed loop bandwidth of the single-stage converter to achieve unconditional stability in the presence of high line impedances, while maintaining an overall fast transient response and rejection of line borne disturbances without a significant increase in the size of energy storage elements in the converter as compared with prior art arrangements.

BRIEF DESCRIPTION OF THE DRAWINGS

Other features and advantage of one or more preferred embodiments of the present invention will be readily apparent to one of ordinary skill in the art from the following written description with reference to and, used in conjunction with, the accompanying drawings, in which.

DESCRIPTION OF PREFERRED EMBODIMENT

The present invention, in one embodiment, provides a substantially lossless, bi-directional shunt active filter in combination with a secondary circuit of a single-stage, polyphase AC to DC power converter. The bi-directional shunt active filter includes an inductor, a half-bridge of bi-directional switches, an energy storage capacitor, a current measurement device and a wide bandwidth control circuit. The polyphase single stage AC to DC power converter includes an input AC filter, a full bridge of high frequency AC switches, a high frequency isolation transformer, a secondary rectifier, an output low pass filter, a current measurement device and a low bandwidth control circuit. The bi-directional switches may each be a MOSFET with an internal anti-parallel diode, or a MOSFET with an external anti-parallel diode added. The AC switches may each be two back-to-back IGBTs each with anti-parallel diodes, or two back-to-back MOSFETs with their internal anti-parallel diodes.

Figure 4:
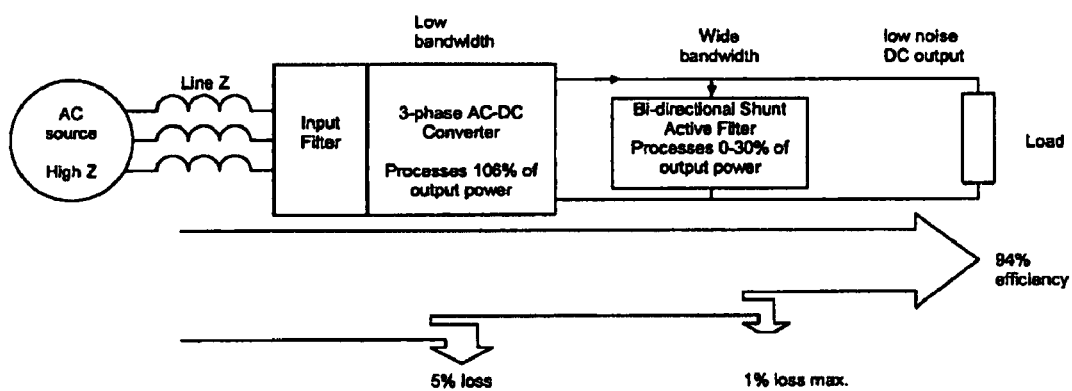
FIG. 4 is a block diagram of a first embodiment of the present invention.

The arrangement of the present invention, as shown in FIG. 4, is such that a controlled current is diverted away from the load. The controlled current is provided by the bi-directional shunt active filter. A control circuit is arranged so that line borne disturbances and output load transients are conducted through the circuit path of the bi-directional shunt active filter, thereby substantially reducing the magnitude of any disturbance appearing on the load terminals of the combined converter.

Figure 1:
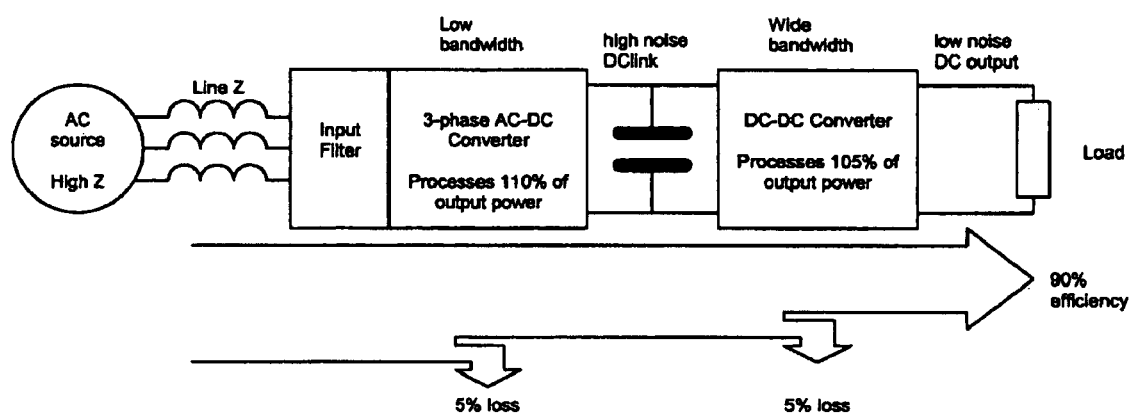
FIG. 1 is a prior art arrangement including two converter stages where the power signal is processed twice.
Figure 2A:
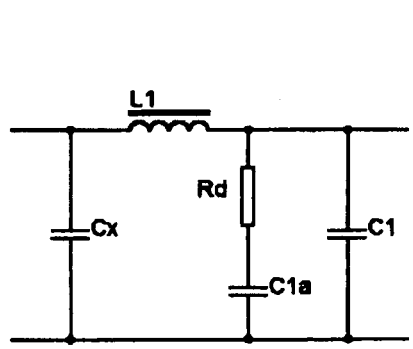
FIGS. 2a to 2c show prior art arrangements where damping is used to reduce the resonant peak in effective source impedance for power converters with marginal stability.
Figure 2B:
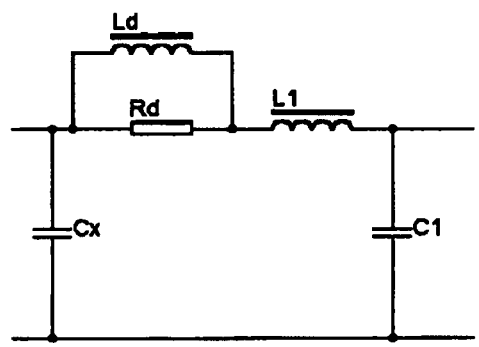
Figure 2C:
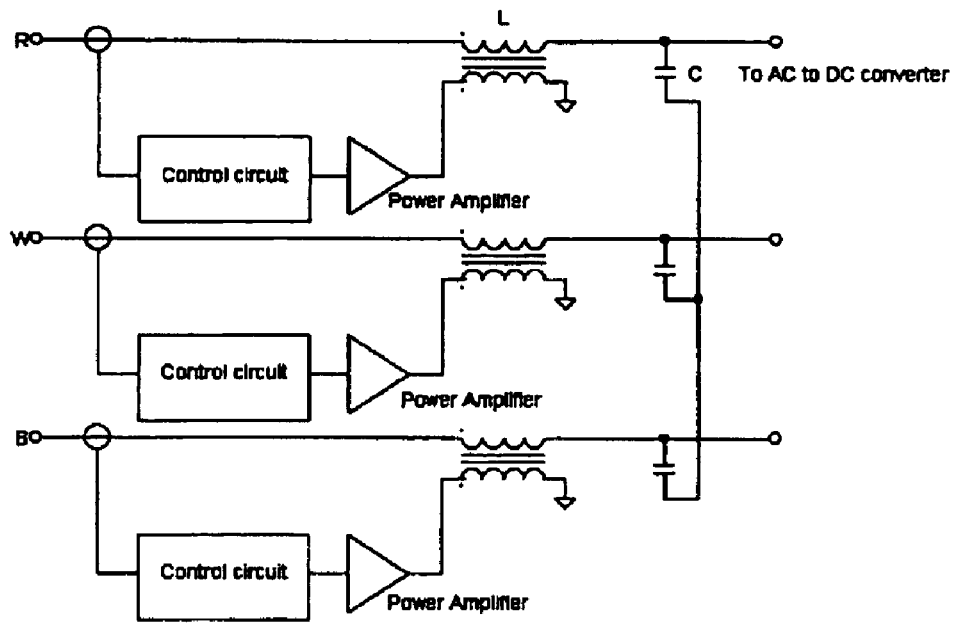
Figure 3:
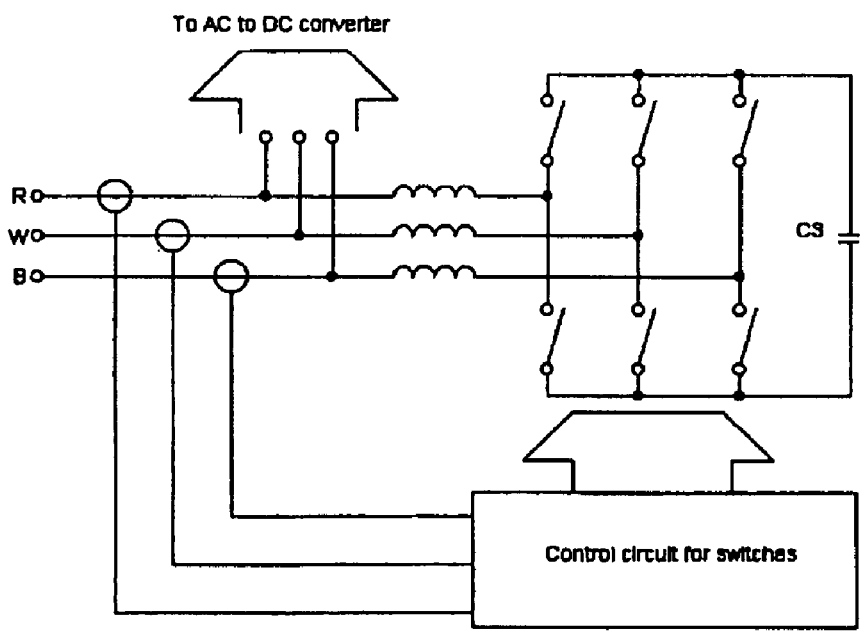
FIG. 3 is a further prior art arrangement including a polyphase shunt active filter connected to the input of a power converter.

The bi-directional shunt active filter may be sized according to the maximum disturbance current to be rejected from the load terminals. The power processed by the bi-directional shunt active filter is reactive or transient in nature. For a harmonic and transient rich supply line or a transient load, the peak power processed by the bi-directional shunt active filter is typically less than one third the load power processed by the AC to DC converter. Under ideal supply line conditions, the bi-directional shunt active filter processes effectively no power as there is practically no line derived reactive power transmitted to the output by the AC to DC converter. Hence, the reduction in the combined power converter efficiency is negligible compared to the AC to DC power converter block alone. The overall efficiency is substantially higher than for the two-stage converter solution of the prior art arrangement as shown in FIG. 1, because the majority of the output power is converted once only. Additionally, the size and weight of the combined converter is only fractionally larger than the single-stage polyphase converter, and substantially reduced from the two-stage converter solution or other prior art.

Referring to FIG. 4, typical definitions of bandwidth for the two converter blocks are: a low bandwidth AC to DC converter has a closed loop bandwidth below the effective source resonant frequency, for example 500 Hz; and a wide bandwidth bi-directional shunt active filter has a closed loop bandwidth which is as high as possible in order to achieve maximum rejection of line borne disturbances and the best load transient response, for example a frequency of 50 kHz.

Figure 5A:
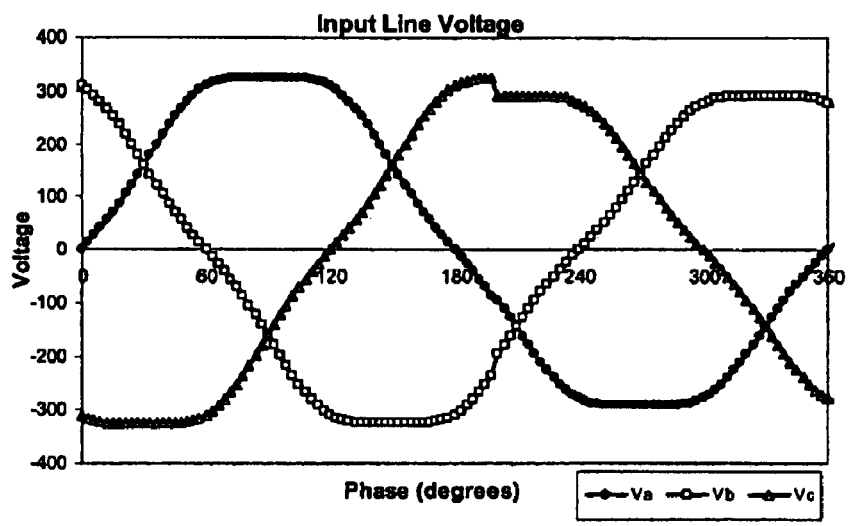
FIGS. 5a to 5c illustrate waveforms of voltage and current in an embodiment of the present invention.
Figure 5B:
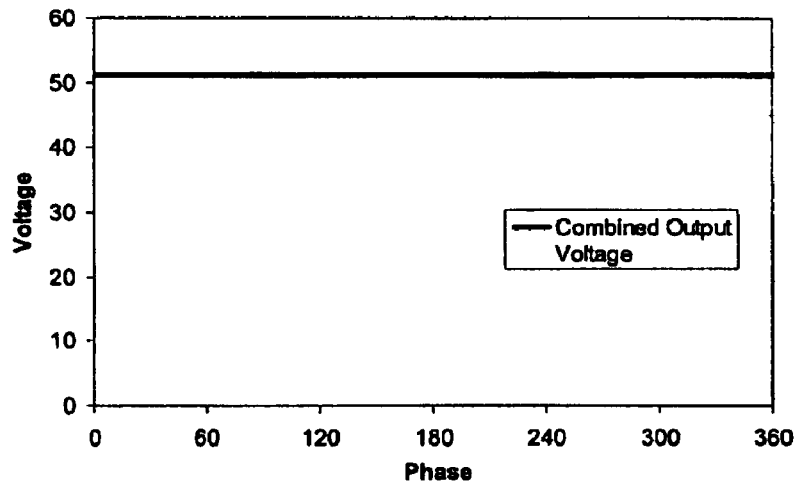
Figure 5C:
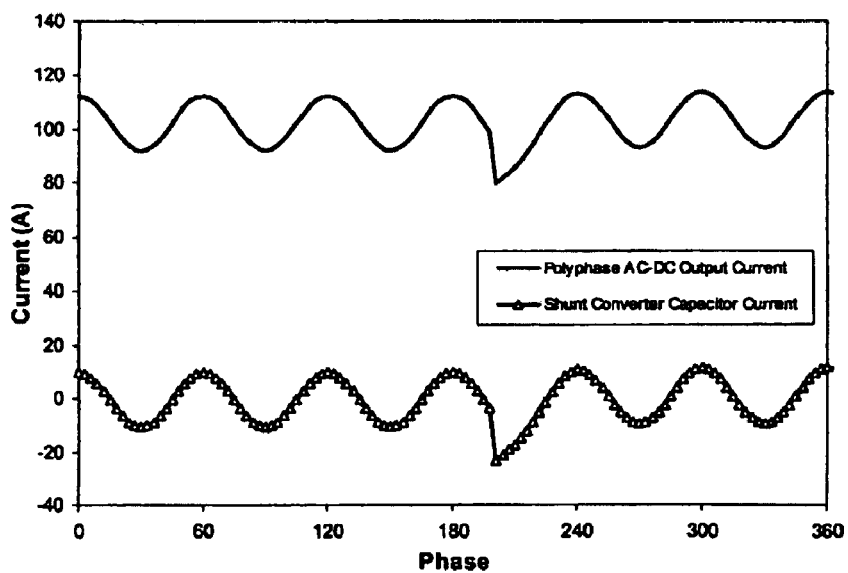

FIGS. 5a to 5c shows an example of voltage waveforms at the input terminals and output terminals of the combined converter, and the corresponding current waveforms of the bi-directional shunt active filter and the output current from the low bandwidth AC to DC converter. The line frequency component of the input terminal voltage, if balanced on all phases, produces a ripple free DC at the output terminals of the three phase AC to DC converter. The voltage waveforms have a high percentage of $5^{th}$ harmonic distortion, as well as a transient event added.

In the three phase case, harmonic frequency components other than triplens will appear on the output given by:

$$Vo_m \propto V_m \left\{ \cos((m-1)x) \left[ 1 + 2\cos\left((m-1)\frac{2\pi}{3}\right) \right] - \cos((m+1)x) \left[ 1 + 2\cos\left((m+1)\frac{2\pi}{3}\right) \right] \right\} \quad (1)$$

where $Vo_m(x)$ is the instantaneous output amplitude of the $m^{th}$ input harmonic of input amplitude $V_m$, and x is the time domain variable. For odd harmonics, which dominate harmonic disturbances of most supply lines, equation (1) has a special property. One of either the first or second terms inside the braces equates to zero and makes $Vo_m$ a function of the nearest $6^{th}$ order multiple harmonic. For example, a $5^{th}$ harmonic on the input will result in a $6^{th}$ harmonic appearing on the output, while a $7^{th}$ harmonic on the input will also result in a $6^{th}$ harmonic appearing on the output but with opposite phase. Similarly, $11^{th}$ and $13^{th}$ harmonics result in $12^{th}$ harmonic voltages appearing on the output, and so on.

For the bi-directional shunt active filter to reduce the above mentioned signals from the output, the disturbance current must be shunted away from the output and into the bi-directional shunt active filter. The example of FIG. 5 shows, a $5^{th}$ order harmonic on the input supply voltage, and a $6^{th}$ order harmonic current flowing into the bi-directional shunt active filter. This results in only the DC component remaining on the output terminals.

The example of FIG. 5 also shows a line transient, which contains frequency components well above the closed loop bandwidth of the three phase single stage low bandwidth AC to DC converter. This disturbance current is similarly shunted to the bi-directional shunt active filter for the frequency spectrum up to the closed loop bandwidth of the bi-directional shunt active filter. For frequencies above that, the output capacitor of the combined converter provides attenuation of the disturbance.

Figure 6:
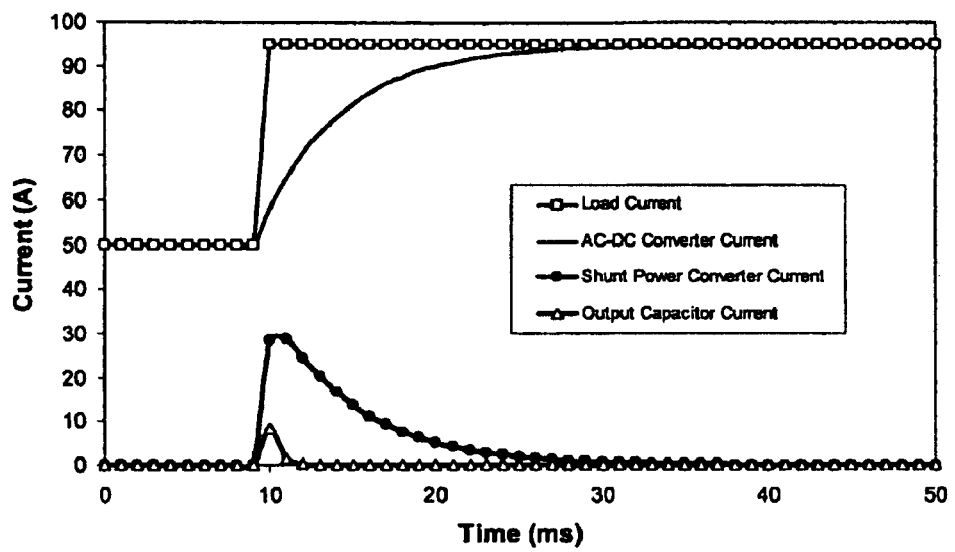
FIG. 6 illustrates waveforms of the input, output and bi-directional shunt active filter current and voltage in response to a step load change for a power converter in accordance with one embodiment of the present invention.

FIG. 6 shows the response of the combined converter to a step load change. The low bandwidth AC to DC converter supplies the low frequency components of the transient, while the bi-directional shunt active filter provides the medium to high frequency components up to the closed loop bandwidth of the bi-directional shunt active filter. The highest frequencies, and any additional load current required if current limiting occurs in the bi-directional shunt active filter, are provided by the output capacitor of the combined converter $C_o$.

Figure 7:
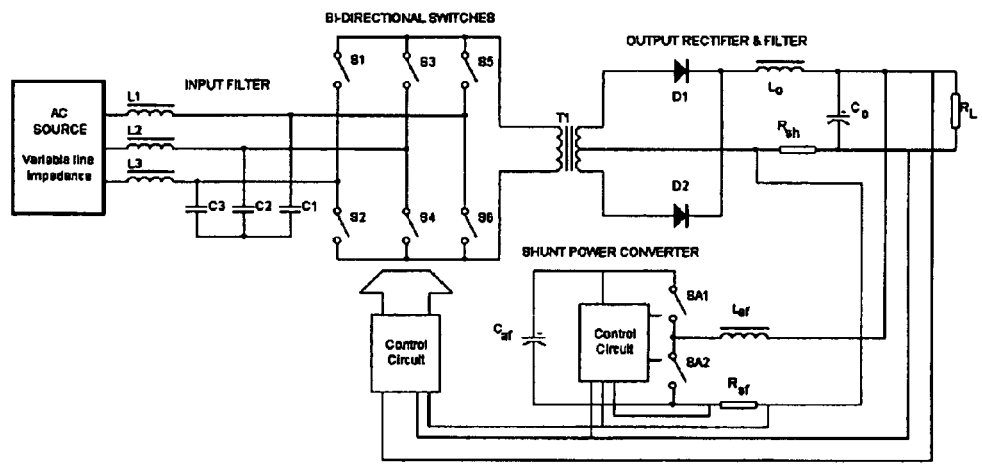
FIG. 7 illustrates a circuit configuration for a power converter in accordance with an exemplary embodiment of the present invention.

FIG. 7 shows one practical circuit implementation of the present invention supplying a load $R_L$. The buck derived high power three phase low bandwidth single stage AC to DC converter comprises an input filter, L1–L3 and C1–C3 attached to the high impedance AC source, six AC (four-quadrant) switches, $S_1$–$S_6$, configured in a full bridge arrangement, an isolation transformer, T1, secondary rectifier diodes, D1 and D2, current measurement device, $R_{sh}$, an output filter, $L_o$ and $C_o$, and a low bandwidth control circuit. The bi-directional shunt active filter connects between the positive output and the input side of the current measurement device $R_{sh}$ of the three phase low bandwidth AC to DC converter. The boost bi-directional shunt active filter consists of a choke, $L_{af}$, a half-bridge of bi-directional (two-quadrant) switches, SA1 and SA2, an energy storage capacitor, $C_{af}$, a current measurement device, $R_{sf}$, and a wide bandwidth control circuit. It is worth noting that when energy is being transferred from the output to $C_{af}$ the action of the circuit is that of a boost converter, and that when energy is being transferred from $C_{af}$ to the output the action of the circuit is that of a buck converter.

The present invention can be applied as a modification to any polyphase AC to DC power converter to enable stable operation of such converters on high line impedance.

As the present invention may be embodied in several forms without departing from the spirit of the essential characteristics of the invention, it should be understood that the above described embodiments are not to limit the present invention unless otherwise specified, but rather should be construed broadly within the spirit and scope of the present invention as defined in the appended claims. Various modifications and equivalent arrangements are intended to be included within the spirit and scope of the present invention and appended claims. For example, the bi-directional shunt active filter may be applied in combination with single phase AC to DC or DC to DC power converters. Alternate output filter arrangements may also be used on the three phase low bandwidth AC to DC converter, which provides alternative connection points of the shunt converter choke $L_{af}$. A variety of switching techniques including conventional PWM, resonant mode, soft switching and others can be used to control the bi-directional shunt active filter and the low bandwidth AC to DC converter.

"Comprises/comprising" when used in this specification is to be taken to specify the presence of stated features, integers, steps or components but does not preclude the presence or addition of one or more other features, integers, steps, components or groups thereof.

The invention claimed is:

1. A wide bandwidth polyphase power converter for connection to a polyphase power supply with high line impedances including:
    a single stage low bandwidth polyphase AC to DC power converter providing a DC output; and
    a filter means for the DC output including a bi-directional shunt active filter having an energy storage element and circuitry for wide bandwidth control of fluctuations at the DC output, arising from line borne or load induced disturbances, by transferring energy to or from the energy storage element.

2. A polyphase power converter as claimed in claim 1, wherein the low bandwidth power converter has a fixed or variable bandwidth.

3. A power converter as claimed in claim 1, wherein the DC output power fluctuations are reactive or transient in nature.

4. A power converter as claimed in claim 1, wherein the DC output power fluctuations, at peak, are less than one third of power input to the low bandwidth power converter.

5. A power converter as claimed in claim 1 wherein in the absence of any reactive or transient fluctuations in the DC output the shunt active filter does not transfer significant energy.

6. A power converter as claimed in claim 1 wherein the low bandwidth power converter includes an isolation device for isolating the polyphase AC input from the DC output.

7. A power converter as claimed in claim 1 wherein the low bandwidth power converter is configured to include a buck derived converter.

8. A power converter as claimed in claim 1 wherein the low bandwidth power converter is configured to include a boost derived converter.

9. A power converter as claimed in claim 1 wherein the shunt active filter includes circuitry configured as a buck converter.

10. A power converter as claimed in claim 1 wherein the shunt active filter includes circuitry configured as a boost converter.

11. A power converter as claimed in claim 1 wherein the low bandwidth power converter includes an input filter, a full bridge of AC switches, a high frequency isolation transformer, a secondary rectifier, a lowpass output filter and a low bandwidth control circuit for controlling the AC switches.

12. A power converter as claimed in claim 1 wherein the shunt active filter includes a half bridge of bi-directional switches, an inductance, an energy storage capacitor and a wide bandwidth control circuit.

13. A power converter as claimed in claim 1 wherein the shunt active filter is connected between a positive and a negative output of the low bandwidth power converter.

14. A power converter as claimed in claim 1 wherein the low bandwidth power converter has a closed loop bandwidth of less than about 500 Hz and the shunt active filter has a closed loop bandwidth of greater than about 50 kHz.

* * * * *